United States Patent
Hyoudou

(10) Patent No.: US 10,558,485 B2
(45) Date of Patent: Feb. 11, 2020

(54) INFORMATION PROCESSING APPARATUS AND METHOD FOR SHIFTING BUFFER

(71) Applicant: FUJITSU LIMITED, Kawasaki-shi, Kanagawa (JP)

(72) Inventor: Kazuki Hyoudou, Chofu (JP)

(73) Assignee: FUJITSU LIMITED, Kawasaki (JP)

( * ) Notice: Subject to any disclaimer, the term of this patent is extended or adjusted under 35 U.S.C. 154(b) by 141 days.

(21) Appl. No.: 15/957,166

(22) Filed: Apr. 19, 2018

(65) Prior Publication Data
US 2018/0307520 A1    Oct. 25, 2018

(30) Foreign Application Priority Data

Apr. 25, 2017    (JP) .................... 2017-086367

(51) Int. Cl.
G06F 9/46     (2006.01)
G06F 9/455    (2018.01)
G06F 9/48     (2006.01)

(52) U.S. Cl.
CPC ........ G06F 9/45558 (2013.01); G06F 9/4856 (2013.01); G06F 2009/45579 (2013.01); G06F 2009/45583 (2013.01); G06F 2009/45595 (2013.01)

(58) Field of Classification Search
None
See application file for complete search history.

(56) References Cited

U.S. PATENT DOCUMENTS

2013/0326000 A1    12/2013    Li
2016/0092258 A1    3/2016    Mehta et al.

Primary Examiner — Gregory A Kessler
(74) Attorney, Agent, or Firm — Fujitsu Patent Center

(57) ABSTRACT

A non-transitory computer-readable recording medium storing a program that causes a computer including a first-processor in which a first-thread is executed at a first-node having a first-buffer and a communication device and a second-processor in which a second-thread is executed at a second-node having a second-buffer, the first-thread includes setting an output-destination of the communication device to the second-buffer with respect to a flow addressed to a virtual machine executed in the second-processor, notifying the second-processor of a switch notification information of the setting the output-destination of the communication device to the second-buffer, and transferring a packet stored in the first-buffer to the second-processor, and the second-thread includes receiving the switching notification, suspending temporarily a reception-process of the second-buffer for the flow, transferring the packet transferred by the first-processor to the virtual machine, and resuming the reception-process of the second-buffer after the packet is transferred to the virtual machine.

9 Claims, 18 Drawing Sheets

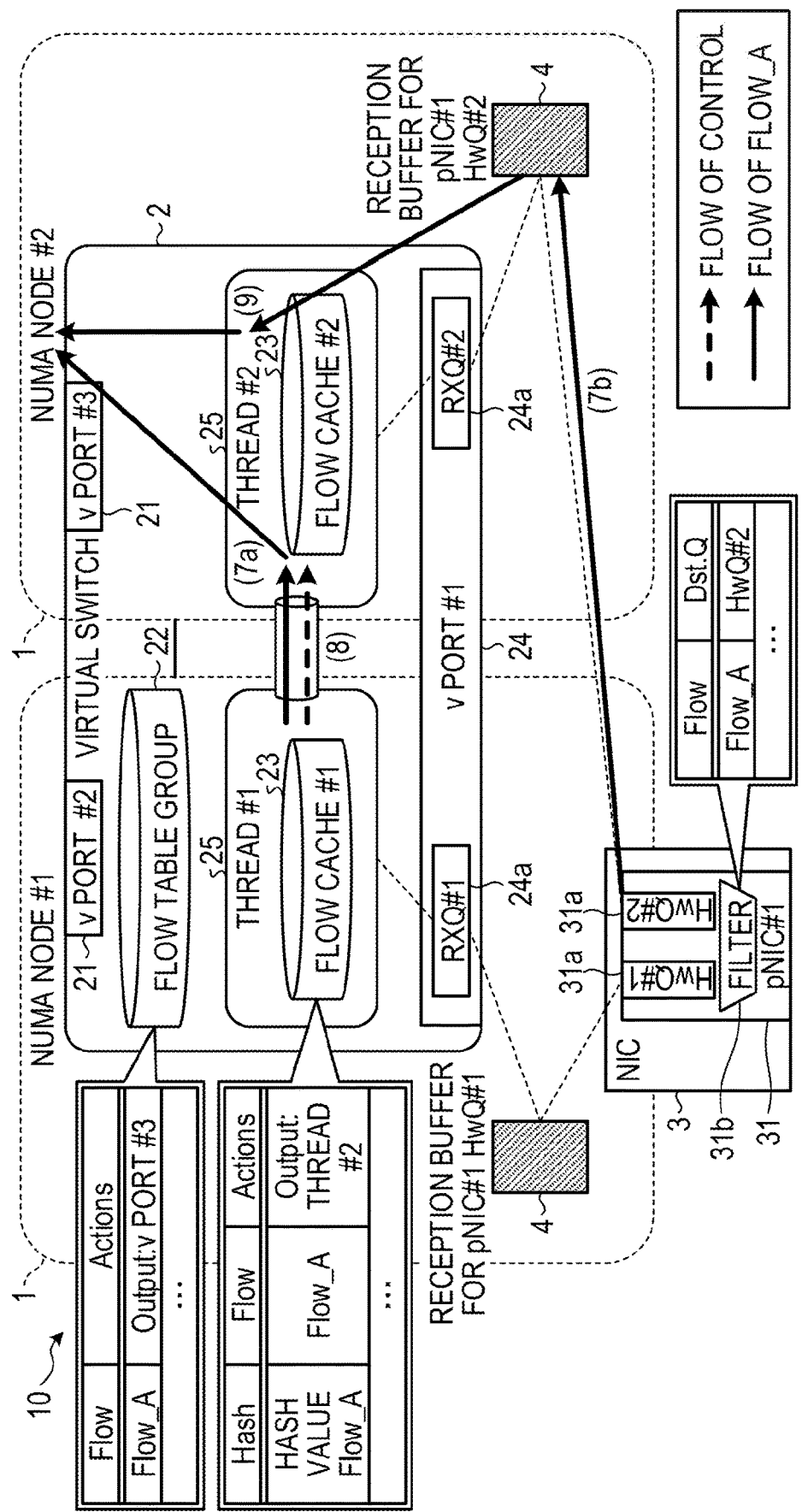

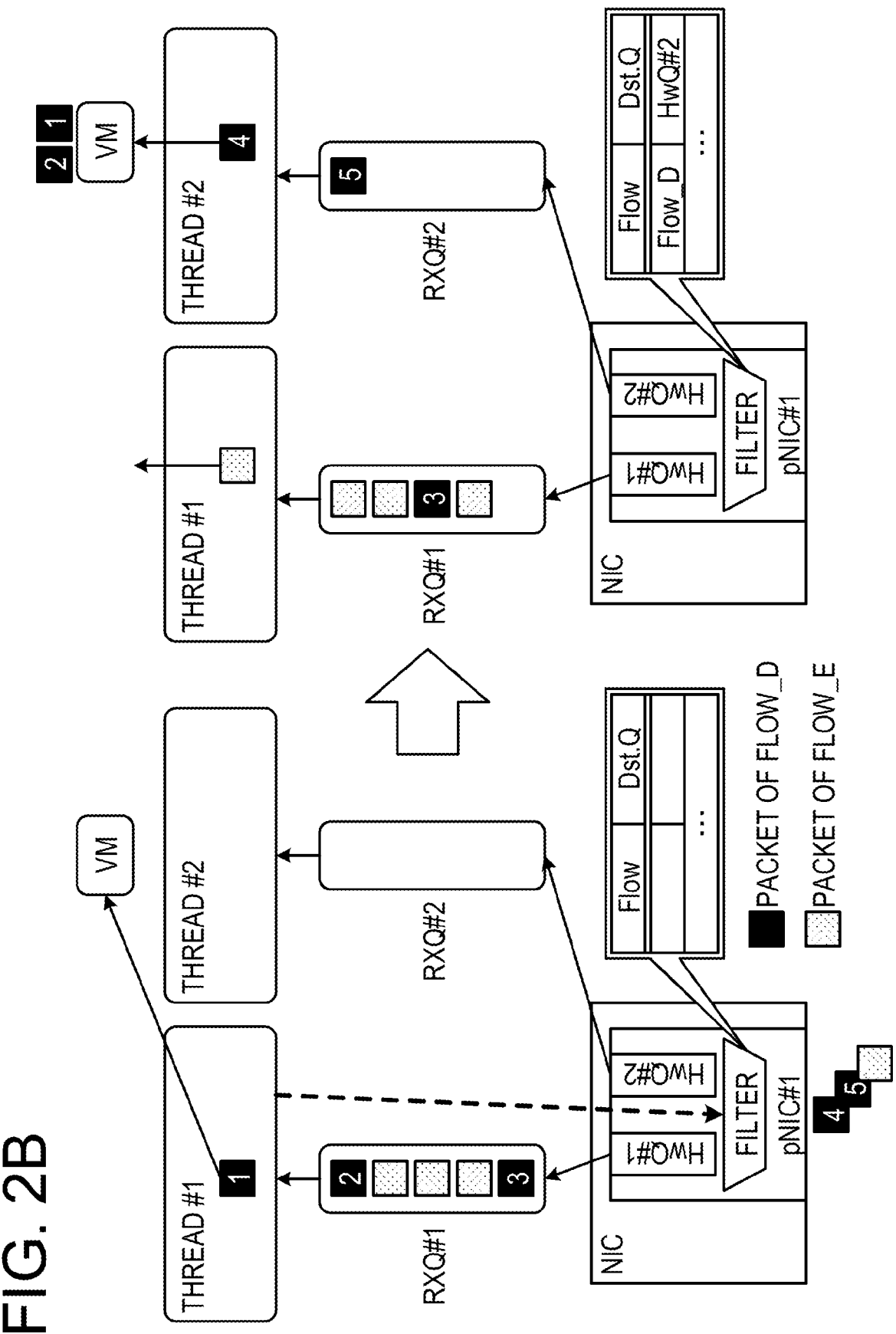

FIG. 6A

(a) BASIC FORMAT

| TYPE (2B) | Length (2B) | Hash Value (4B) | Payload (Length Byte) ... |
|---|---|---|---|

TYPE: TYPE OF THREAD CONTROL PACKET
- QUEUE SWITCHING NOTIFICATION: TYPE='start'
- QUEUE SWITCHING COMPLETION NOTIFICATION: TYPE='comp'
- DATA TRANSFER: TYPE='data'
Length: SIZE (BYTES) OF PAYLOAD UNIT OF THIS THREAD CONTROL PACKET
Hash Value: HASH VALUE OF FLOW INFORMATION (12 TUPLES) OF NOTIFICATION FLOW
Payload: NOTIFICATION DATA
DIFFERENT CONTENTS ARE INCLUDED FOR DIFFERENT NOTIFICATION TYPES

(b) EXAMPLE OF QUEUE SWITCHING NOTIFICATION

| TYPE='start' | Length=XXXX | Hash Value=K | Payload ... |
|---|---|---|---|

TYPE='start'
Payload: FLOW CACHE ENTRY INFORMATION OF QUEUE SWITCHING TARGET FLOW (BEFORE ACTION REWRITE)

| RECEPTION PORT | TRANSMISSION SOURCE MAC | DESTINATION MAC | Ether TYPE | VLAN ID | VLAN Prio | TRANSMISSION SOURCE IP | DESTINATION IP | IP Proto | IP ToS | L4 Sport | L4 Dport | ACTION |
|---|---|---|---|---|---|---|---|---|---|---|---|---|
| 1 | MAC_D | MAC_B | 0x800 | 10 | 0 | IP_D | IP_B | TCP | 0 | 80 | 2000 | VLANtrans:100, Output2 |

FIG. 6B (c) EXAMPLE OF QUEUE SWITCHING COMPLETION NOTIFICATION

TYPE='comp'
Payload: FLOW INFORMATION (12 TUPLES) OF QUEUE SWITCHING TARGET FLOW

| TYPE='comp' | Length=YYYY | Hash Value=K | Payload ... |
|---|---|---|---|

| RECEPTION PORT | TRANSMISSION SOURCE MAC | DESTINATION MAC | Ether TYPE | VLAN ID | VLAN Prio | TRANSMISSION SOURCE IP | DESTINATION IP | IP Proto | IP ToS | L4 Sport | L4 Dport |
|---|---|---|---|---|---|---|---|---|---|---|---|
| 1 | MAC_D | MAC_B | 0x800 | 10 | 0 | IP_D | IP_B | TCP | 0 | 80 | 2000 |

(d) EXAMPLE OF (INTER-THREAD) DATA TRANSFER PACKET

TYPE='data'
Payload: FLOW INFORMATION OF QUEUE SWITCHING TARGET FLOW + TRANSFER PACKET

| TYPE='data' | Length=ZZZZ | Hash Value=K | Payload ... |
|---|---|---|---|

| RECEPTION PORT | TRANSMISSION SOURCE MAC | DESTINATION MAC | Ether TYPE | VLAN ID | VLAN Prio | TRANSMISSION SOURCE IP | DESTINATION IP | IP Proto | IP ToS | L4 Sport | L4 Dport | TRANSFER PACKET |
|---|---|---|---|---|---|---|---|---|---|---|---|---|
| 1 | MAC_D | MAC_B | 0x800 | 10 | 0 | IP_D | IP_B | TCP | 0 | 80 | 2000 | |

| Ether Hdr | IP Hdr | TCP Hdr | TCP Payload |
|---|---|---|---|

FIG. 7

(a) EXAMPLE OF TRANSITION MANAGEMENT TABLE A

| ADDRESS | FLOW INFORMATION (12 TUPLES) | DESTINATION THREAD | COUNT VALUE |
|---|---|---|---|
| 1 | Flow_A | 2 | 512 |
| 2 | Flow_B | 3 | 20 |
| ... | | | |
| L | Flow_X | 2 | 300 |

(b) EXAMPLE OF TRANSITION MANAGEMENT TABLE B

| ADDRESS | SUSPEND PORT NUMBER | THE NUMBER OF FLOWS UNDER TRANSITION |
|---|---|---|
| 1 | 1 | 1 |
| 2 | 2 | 3 |
| ... | | |
| M | X | 2 |

INFORMATION PROCESSING APPARATUS AND METHOD FOR SHIFTING BUFFER

CROSS-REFERENCE TO RELATED APPLICATION

This application is based upon and claims the benefit of priority of the prior Japanese Patent Application No. 2017-086367, filed on Apr. 25, 2017, the entire contents of which are incorporated herein by reference.

FIELD

The embodiments discussed herein are related to an information processing apparatus and a method for shifting buffer.

BACKGROUND

In recent years, there have been an increasing number of cases where a server equipped with a plurality of central processing units (CPUs) adopts a non-uniform memory access (NUMA) architecture that facilitates a scale-up.

FIG. 14 is a view illustrating a server of a NUMA architecture. As illustrated in FIG. 14, the server of the NUMA architecture has a plurality of NUMA nodes. For the convenience of explanation, only two NUMA nodes represented by a NUMA node #1 and a NUMA node #2 are illustrated In FIG. 14, but the server of the NUMA architecture may have three or more NUMA nodes.

The server of the NUMA architecture has a memory independently for each CPU. That is, the NUMA node #1 has a CPU #1 and a memory #1, and the NUMA node #2 has a CPU #2 and a memory #2. Each CPU includes a memory controller, an inter processor link (IPL) controller, and an I/O controller.

The memory controller is connected to a memory and controls an access to the memory. The IPL controller controls the communication between the processors. The I/O controller controls an I/O device to be connected. A network interface card (NIC) is connected to the I/O controller of the NUMA node #1.

In the server of the NUMA architecture, the basic software (operating system (OS)) allocates an application with a memory of the same NUMA node as a CPU on which the application is operating, so that the memory access conflict among CPUs may be reduced. Therefore, a scale up of the server of the NUMA architecture is easier than a server of a uniform memory access (UMA) architecture in which plural CPUs are connected to a memory via a common memory controller.

However, in the server of the NUMA architecture, a performance degradation occurs in a virtual environment using a virtual switch. FIG. 15 is a view for explaining a performance degradation in a virtual environment using a virtual switch. In FIG. 15, a VM #1 is a virtual machine (VM) operating on the NUMA node #1, and a VM #2 is a virtual machine operating on the NUMA node #2. The VM #1 and the VM #2 receive packets from a network via the virtual switch. The VM #1 and the VM #2 receive packets using a virtual NIC (vNIC) reception buffer. The vNIC reception buffer of the VM #1 is installed in the memory #1, and the vNIC reception buffer of the VM #2 is installed in the memory #2.

The function of the virtual switch is implemented when plural threads are executed by a CPU. The plural threads are executed by the CPU #1 or the CPU #2. The virtual switch has two v ports (virtual ports) for VM and a logical port associated with a physical port of NIC.

When a physical port represented by a pNIC #1 of the NIC receives a packet from the network (1), the received packet is written in a reception buffer of the pNIC #1 with direct memory access (DMA) (2). The reception buffer of the pNIC #1 is generally installed in the memory #1 of the NUMA node #1 to which the NIC is connected. Then, a thread of the virtual switch reads the packet from the reception buffer of the pNIC #1 (3), and when the packet is addressed to the VM #2, writes the packet in the vNIC reception buffer of the VM #2 (4).

Here, since the thread of the virtual switch operates on the CPU #1, the write in the vNIC reception buffer of the VM #2 becomes the write in a remote memory. Therefore, in comparison to the vNIC reception buffer of the VM #1, the performance is substantially reduced in the write in the vNIC reception buffer of the VM #2.

Thus, there has been proposed a technique in which a physical reception queue for each NUMA node is allocated to a physical port of the NIC, a virtual port for each NUMA node is associated with the physical port of the NIC, a reception queue is allocated for each virtual port, and a DMA destination of the physical reception queue is assumed as a reception buffer of the corresponding NUMA node. According to this technique, it is possible to prevent a degradation of communication performance between the NIC and VM existing in different NUMA nodes.

In addition, there has been proposed a technique in which a load balancer allocates a VM using a specific NUMA node to a network queue of the same NUMA node, and a scheduler allocates the VM to the same NUMA node as the NIC or the network queue.

Further, there has been proposed a technique in which a network adapter routes a received packet having a packet flow identifier to a transmission/reception queue associated with the packet flow identifier among plural transmission/reception queues storing transfer packets.

Related technologies are disclosed in, for example, U.S. Pat. Nos. 9,495,192 and 9,069,722.

SUMMARY

According to an aspect of the invention, a non-transitory computer-readable recording medium storing a program that causes a computer including a first processor in which a first thread is executed at a first node having a first reception buffer and a communication device and a second processor in which a second thread is executed at a second node having a second reception buffer, the first thread includes setting an output destination of the communication device to the second reception buffer with respect to a flow addressed to a virtual port of a virtual machine executed in the second processor, notifying the second processor of a switch notification information of the setting the output destination of the communication device to the second reception buffer, and transferring a packet stored in the first reception buffer to the second processor, and the second thread includes receiving the switching notification, suspending temporarily a reception process of the second reception buffer for the flow, transferring the packet transferred by the first processor to the virtual port, and resuming the reception process of the second reception buffer after the packet is transferred to the virtual port.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1B is a second view for explaining the example of the operation of the information processing apparatus according to the embodiment;

FIG. 2B is a view for explaining overtaking of a subsequent packet;

FIG. 6A is a first view illustrating an example of a thread control packet;

FIG. 6B is a second view illustrating an example of a thread control packet;

FIG. 7 is a view illustrating an example of a transition management table;

DESCRIPTION OF EMBODIMENTS

Figure 1A:
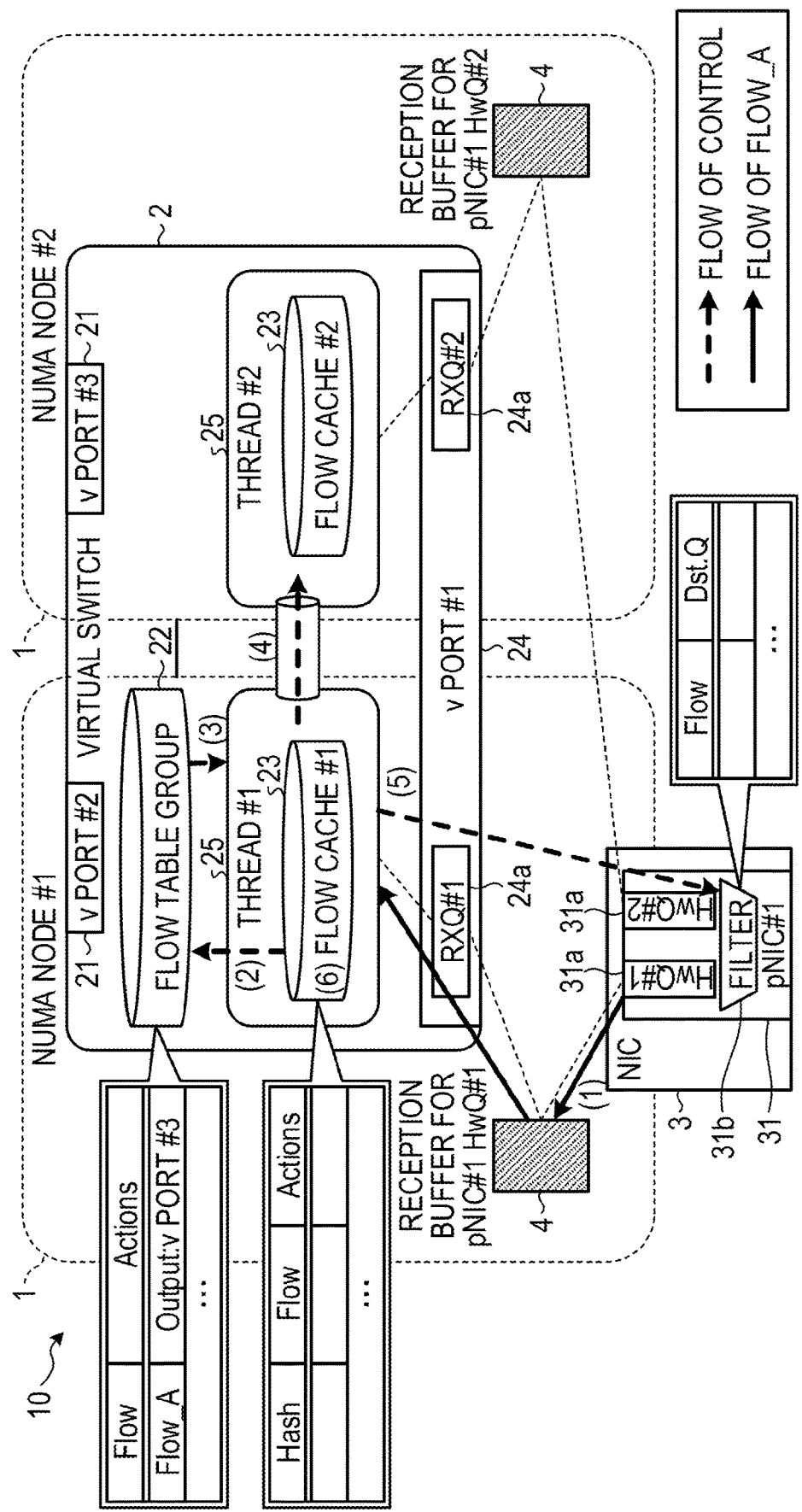
FIG. 1A is a first view for explaining an example of an operation of an information processing apparatus according to an embodiment.

In order to assume a DMA destination of a physical reception queue for each NUMA node as a reception buffer of the corresponding NUMA node, it is necessary for the NIC to register specific information of the NUMA node of the DMA destination corresponding to a destination of a received packet. However, in some cases, the specific information may not be registered in advance in the NIC. Specifically, in the network function virtualization (NFV) environment, there is a case where communication is performed with a virtual media access control (MAC) address dynamically generated internally by a VM, and the specific information of the NUMA node at the DMA destination may not be registered in advance.

Embodiments of a technique capable of dynamically switching a physical reception queue of NIC so that a packet received by the NIC is DMA-transferred to a NUMA node on which a destination VM operates will be described in detail with reference to the drawings. The present disclosure is not limited by the embodiments.

EMBODIMENTS

First, an operation of an information processing apparatus according to an embodiment will be described. The information processing apparatus according to the embodiment performs the following operations.

(1) The information processing apparatus according to the embodiment has at least one reception queue for each NUMA node for each virtual switch port corresponding to a physical port of the NIC. Then, the information processing apparatus according to the embodiment sets a DMA destination of hardware queue (HwQ) corresponding to the reception queue in the physical port of the NIC in a memory of the NUMA node corresponding to the reception queue.

(2) Then, the information processing apparatus according to the embodiment allocates at least one thread to each NUMA node and causes the allocated thread to take charge of a reception process of the reception queue of the same NUMA node.

(3) Then, a thread #1 allocated to the NUMA node #1 establishes a communication path with threads allocated to other NUMA nodes.

(4) Then, when registering a flow and an action in a flow cache, the thread #1 determines whether or not registration in a filter of NIC is required, based on the NUMA node to which an output port of the flow belongs. Then, when it is determined that registration is required, the thread #1 executes the following procedure. (4-1) The thread #1 registers the flow information and the output destination HwQ information of the flow in the filter of the NIC. (4-2) The thread #1 notifies the thread #2 of the switching destination NUMA node #2 via an inter-thread communication path that the switching of the reception queue and HwQ has been performed at a port that received the flow. (4-3) The thread #1 changes an output destination of the action of the flow to thread #2 and registers the changed output destination in the flow cache. (4-4) The thread #1 then notifies the thread #2 of the switching completion when a certain number of packets are received on the port or when there is no received packet.

(5) Upon receiving the notification of the queue switching, the thread #2 temporarily stops the reception process of the port and preferentially executes the data processing from the thread #1. (6) Upon receiving the switching completion notification from the thread #1, the thread #2 resumes the reception process of the port.

A specific example of the above operation will be described with reference to FIGS. 1A and 1B. FIGS. 1A and 1B are views for explaining an example of the operation of the information processing apparatus according to the embodiment. In FIGS. 1A and 1B, a thick dashed line arrow indicates a flow of control and a thick solid line arrow indicates a flow denoted by Flow_A.

An information processing apparatus 10 according to the embodiment is a server of the NUMA architecture and has NUMA nodes 1 represented by a NUMA node #1 and a NUMA node #2 as illustrated in FIG. 1A. Each NUMA node 1 has a memory and a CPU. For convenience of explanation, each of FIGS. 1A and 1B illustrates only two NUMA nodes 1. However, the information processing apparatus 10 may have three or more NUMA nodes 1.

The NUMA node #1 has a NIC 3. The NIC 3 has a physical port 31 represented by a pNIC #1. The pNIC #1 has two hardware reception queues 31a and 31b represented by HwQ #1 and HwQ #2, and a filter 31b. The hardware reception queue 31a is a queue for storing packets received by the pNIC #1. The HwQ #1 is a hardware reception queue 31a for the NUMA node #1, and a DMA destination is a reception buffer 4 for the HwQ #1. The HwQ #2 is a hardware reception queue 31a for the NUMA node #2, and the DMA destination is a reception buffer 4 for the HwQ #2.

A distribution destination (Dst.Q) for a flow to which a packet received by the pNIC #1 belongs is registered in the filter 31b. By default, the HwQ #1 is set as the distribution destination.

In the NUMA node #1 and the NUMA node #2, a virtual switch 2 operates. The function of the virtual switch 2 is implemented by executing plural threads. The plural threads are executed by the CPU of the NUMA node #1 or the CPU of the NUMA node #2. In the NUMA node #1, a thread #1 operates as a thread 25 of the virtual switch 2. In the NUMA node #2, a thread #2 operates as the thread 25 of the virtual switch 2.

The multiple threads form a switch program. The switch program is read from the memory of the NUMA node 1 and executed by the CPU of the NUMA node 1. In addition, the switch program may be read from a nonvolatile storage medium such as a DVD and installed in the NUMA node 1. In addition, the switch program may be read from another information processing apparatus connected via a network and installed in the NUMA node 1.

The virtual switch 2 has v port #1 which is a virtual switch port 24 corresponding to a physical port 31 of the NIC 3. In addition, the virtual switch 2 has a virtual port 21 for VM which operates on the NUMA node #1 and is represented by a v port #2, and a virtual port 21 for VM which operates on the NUMA node #2 and is represented by v port #3. The v port #1 has reception queues 24a represented by RXQ #1 and RXQ #2. The RXQ #1 corresponds to the HwQ #1, and the RXQ #2 corresponds to the HwQ #2.

Further, the virtual switch 2 has a flow table group 22 in the NUMA node #1. The flow table group 22 is a series of tables for defining actions for flow. There may be multiple actions. In FIG. 1A, "output destination is v port #3" (Output: v port #3) is defined as an action for Flow_A.

The thread 25 has a flow cache 23. The flow cache 23 is a cache of the flow table group 22 and may associate a flow and an action with a hash value calculated from flow information. The thread #1 has a flow cache 23 represented by a flow cache #1, and the thread #2 has a flow cache 23 represented by a flow cache #2.

Upon receiving a packet group of Flow_A, the pNIC #1 stores the packet group in the default HwQ #1, and the packet group stored in the HwQ #1 is DMA-transferred (1) to the reception buffer 4 for the HwQ #1. Then, the thread #1 takes the first packet out of the reception buffer 4 for the HwQ #1 and searches for the flow cache #1. However, since the flow cache #1 does not hit, the thread #1 searches the flow table group 22 (2).

Then, since the information of Flow_A hits and the v port #3 of the output destination belongs to the NUMA node #2, the thread #1 and the thread #2 execute the following queue switching procedure (3). That is, the thread #1 notifies the thread #2 of the queue switching of the v port #1 (4) and registers the HwQ #2 as the output destination of Flow_A in the filter 31b of the NIC 3 (5). The thread #2 notified of the queue switching interrupts the reception process of the v port #1.

Then, the thread #1 changes the action corresponding to Flow_A to "output destination is thread #2" (Output: thread #2) and registers the changed action in the flow cache #1 (6). Then, as illustrated in FIG. 1B, the thread #1 transfers a packet of Flow_A stored in HwQ #1 before the queue switching to the thread #2 according to the contents of the flow cache #1 (7a). The thread #2 preferentially processes the data received from the thread #1. At the same time, a packet of Flow_A received after the queue switching is DMA-transferred from the HwQ #2 to the NUMA node #2 (7b).

Then, when the process of Flow_A on the thread #1 side is completed, the thread #1 notifies the thread #2 of queue switching completion (8). Then, the thread #2 resumes the reception process of the v port #1 (9).

Figure 2A:
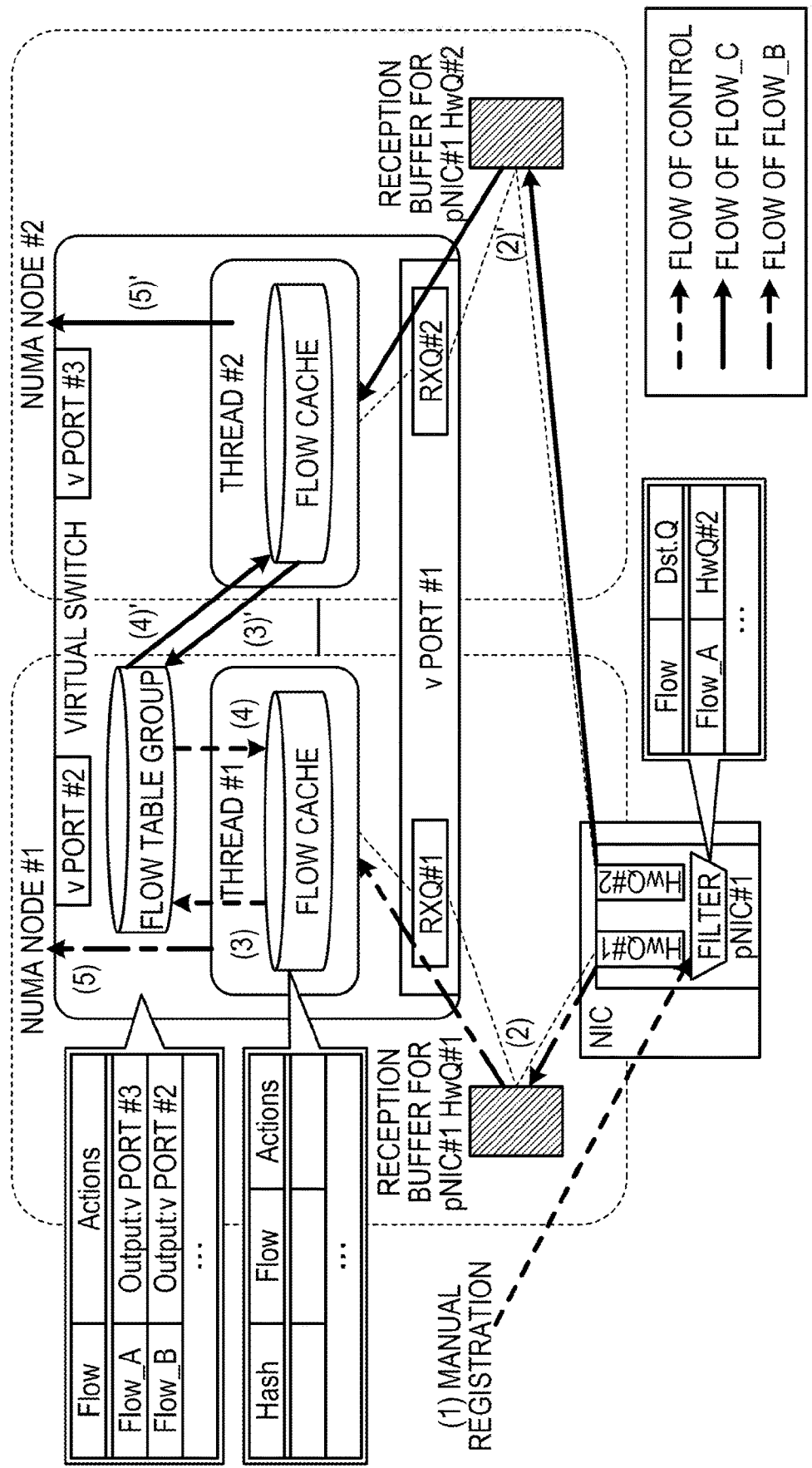
FIG. 2A is a view for explaining the operation of a conventional virtual switch.

Here, an operation of a conventional virtual switch will be described for comparison. FIG. 2A is a view for explaining the operation of a conventional virtual switch. In FIG. 2A, a thick solid line indicates a flow of Flow_C, and a thick dash-dot line indicates a flow of Flow_B.

As illustrated in FIG. 2A, in the conventional virtual switch, manual registration is performed (1) and dynamic registration is not performed, in the filter. In addition, the processes (2), (3), (4), and (5) of Flow_B and the processes (2)', (3)', (4)', and (5)' of Flow_C are executed in parallel. Automatic switching of a destination NUMA node corresponding to the reception flow is not performed.

As illustrated in FIGS. 1A and 1B, when the thread #2 is notified of the queue switching from the thread #1, the thread #2 suspends the reception process of the corresponding flow. When the thread #2 is notified of the queue switching completion, the thread #2 resumes the reception process of the corresponding flow. In this way, the thread #1 notifies the thread #2 of the queue switching or the queue switching completion, and the thread #2 suspends or resumes the reception process of the corresponding flow based on the notification from the thread #1, so that packets are transferred to the VM in the correct order.

FIG. 2B is a view for explaining overtaking of a subsequent packet. Overtaking of a subsequent packet occurs when there is no mechanism where the thread #1 notifies the thread #2 of the queue switching or the queue switching completion and the thread #2 suspends or resumes the reception process of the corresponding flow based on the notification from the thread #1.

The left side of FIG. 2B illustrates a case where the packet #2 and the packet #3 of Flow_D are gathered in the RXQ #1 until the first packet #1 of Flow_D is processed by the thread #1 and the queue switching registration is performed in the filter 31b. Then, when the queue switching registration is performed, a subsequent packet #4 of Flow_D is processed by the thread #2 and overtakes the packet #3 while the thread #1 processes a packet of Flow_E, as illustrated on the right side of FIG. 2B.

Figure 3:
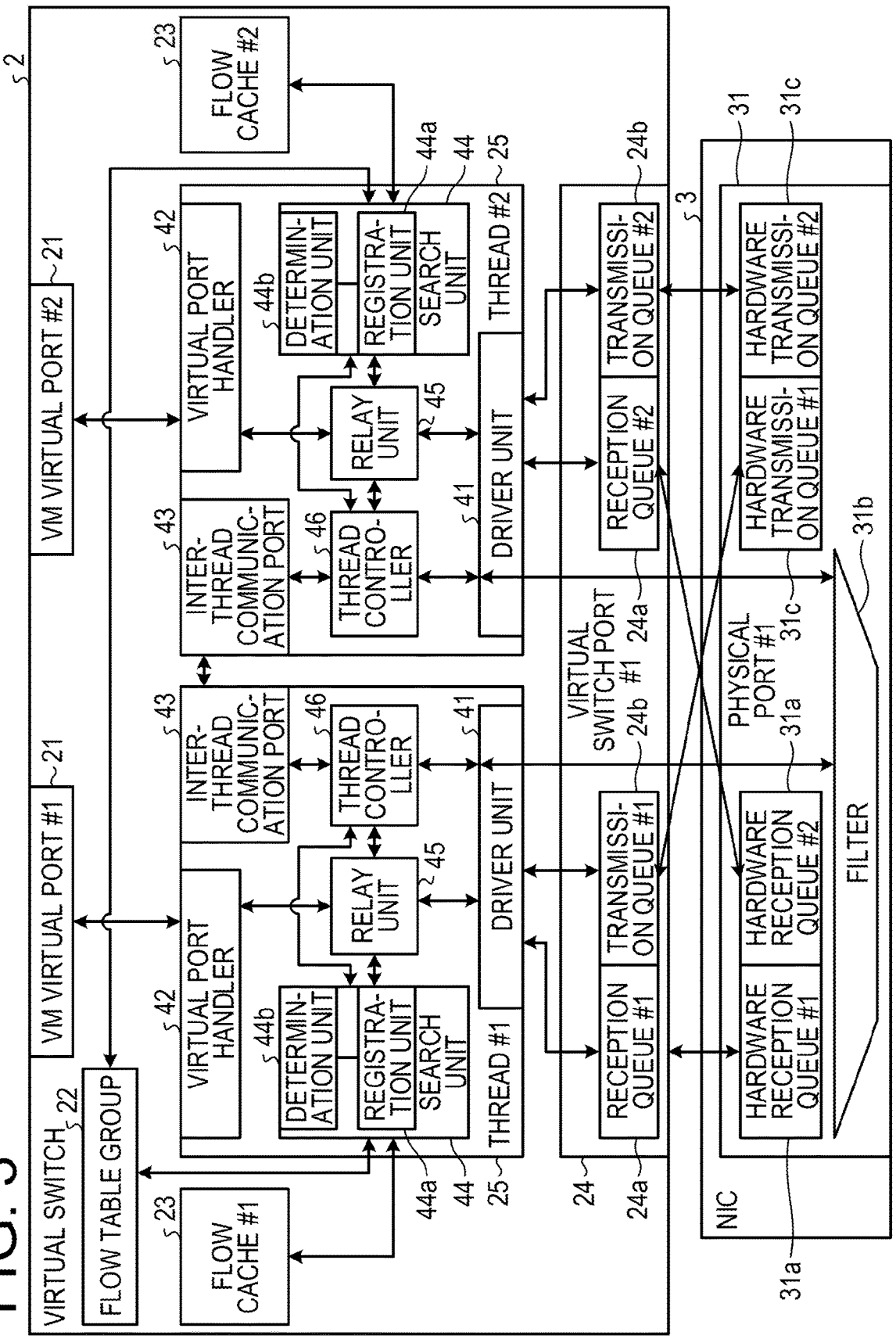
FIG. 3 is a view illustrating a functional configuration of a virtual switch.

Next, a functional configuration of the virtual switch 2 will be described. FIG. 3 is a view illustrating the functional configuration of the virtual switch 2. As illustrated in FIG. 3, the virtual switch 2 has VM virtual ports 21 represented by a VM virtual port #1 and a VM virtual port #2. In addition, the VM virtual port #1 corresponds to the v port #2 illustrated in FIG. 1A, and the VM virtual port #2 corresponds to the v port #3 illustrated in FIG. 1A.

In addition, the virtual switch 2 has a flow table group 22, two flow caches 23 represented by a flow cache #1 and a flow cache #2, and a virtual switch port 24 represented by a virtual switch port #1. In addition, the virtual switch 2 has two threads 25 represented by a thread #1 and a thread #2.

Figure 4:
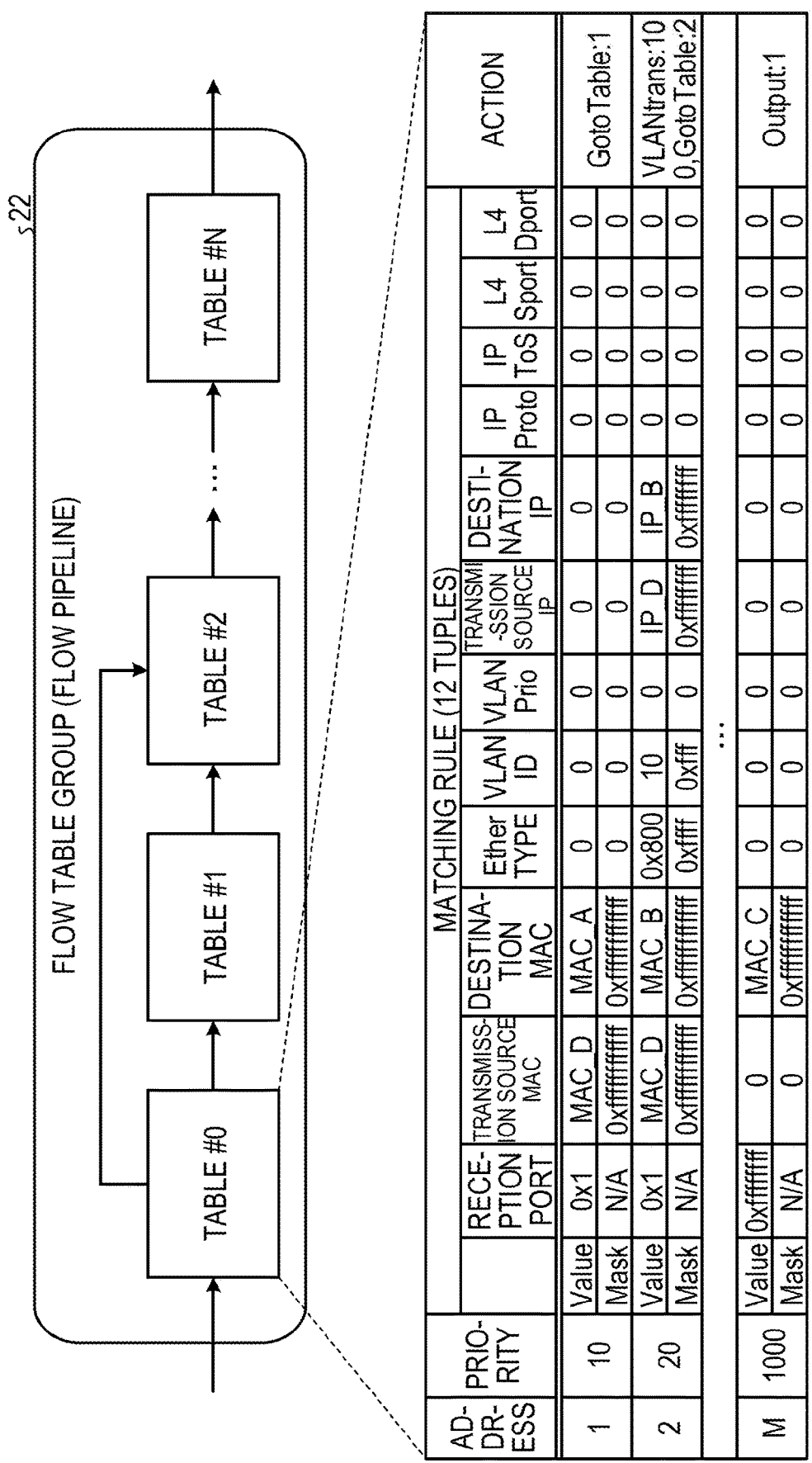
FIG. 4 is a view illustrating an example of a flow table.

The flow table group 22 includes a plurality of flow tables and constitutes a flow pipeline. FIG. 4 is a view illustrating an example of the flow tables. Each flow table is a wild card match (with mask) table.

As illustrated in FIG. 4, the flow table includes an address, a priority, a matching rule, and an action. The address is a value indicating a position at which each entry is stored. The priority indicates an order of checking a matching rule. The matching rule is checked in an ascending order of a priority value.

The matching rule is used to specify an action on a received packet. The matching rule includes Value and Mask for flow information (12 tuples) included in the received packet. The 12 tuples are a reception port, a transmission source MAC, a destination MAC, an Ether type, a VLAN ID, a VLAN Prio, a transmission source IP, a destination IP, IP Proto, IP ToS, L4 Sport, and L4 Dport. Here, the VLAN stands for a virtual local area network, and the IP stands for Internet Protocol.

The reception port is a port number of a port that receives a packet. The transmission source MAC is an MAC address of a packet transmission source. The destination MAC is an MAC address of a packet destination. The Ether type indicates a type of an upper layer packet. The VLAN ID is an identifier for identifying a VLAN. The VLAN Prio is a priority of VLAN. The transmission source IP is an IP address of a packet transmission source. The destination IP is an IP address of a packet destination. The IP Proto indicates an IP protocol number. The IP ToS indicates a type of a communication service. The L4 Sport is a transmission source port number of L4. The L4 Dport is a destination port number of L4.

The Value is a value that is checked as to whether or not the value matches a value of a tuple included in the received packet. The Mask is a mask for fetching the value of the tuple, and a bit corresponding to a mask value of 1 is fetched from the tuple and compared with the Value. However, a mask value=0 matches any data.

There is no mask value in the reception port (N/A) and the field of the reception port is matched when (1<<(n−1)) &Value!=0. Here, "<<" is a bit left shift operation. For example, 1<<3 is 1000 in binary. The "n" is the port number [1≤n≤N] and N is the number of reception ports. As the value of the Value set in the field of the reception port, a data structure called a port vector in which 1 is set to the bit position corresponding to the port number to be matched is used. Thus, multiple ports may be designated for the Value.

The action is an action to be performed by a thread when a received packet matches the matching rule. The action is an action to be performed by a thread on a flow specified by the 12 tuples. Multiple actions are called an action list.

For example, "GotoTable: 1" indicates that an action is determined next based on table #1. An action list "VLAN-trans: 100, GotoTable: 2" indicates that the VLAN number is changed to "100" and an action is determined next based on table #2. "Output: 1" indicates that a packet is output to the v-port #1.

Referring back to FIG. 3, in the flow cache 23, the flow information of the received packet and all the actions of the entry matched up to the last flow table including the action of the entry matched in the intermediate flow table are registered in an address indicated by a hash value. The flow cache #1 is for thread #1 and the flow cache #2 is for thread #2.

The virtual switch port 24 is a virtual port corresponding to the physical port 31 of the NIC 3. The virtual switch port 24 has reception queues 24a represented by a reception queue #1 and a reception queue #2, and transmission queues 24b represented by a transmission queue #1 and a transmission queue #2. The reception queue #1 and the transmission queue #1 are for thread #1, and the reception queue #2 and the transmission queue #2 are for thread #2. The virtual switch port #1 corresponds to the v port #1 illustrated in FIG. 1A.

The NIC 3 has a physical port 31 represented by a physical port #1. The physical port 31 has hardware reception queues 31a represented by a hardware reception queue #1 and a hardware reception queue #2, a filter 31b, and hardware transmission queues 31c represented by a hardware transmission queue #1 and a hardware transmission queue #2. The hardware reception queue #1 and the hardware transmission queue #1 are for thread #1, and the hardware reception queue #2 and the hardware transmission queue #2 are for thread #2. The physical port #1 corresponds to the pNIC #1 illustrated in FIG. 1A.

The thread 25 includes a driver unit 41, a virtual port handler 42, an inter-thread communication port 43, a search unit 44, a relay unit 45, and a thread controller 46.

The driver unit 41 reads from and writes in the virtual switch port 24. The driver unit 41 reads out the received packet stored in the reception queue 24a, passes the packet to the relay unit 45, and stores a transmission packet delivered from the relay unit 45 in the transmission queue 24b.

The virtual port handler 42 performs input and output of the VM virtual port 21. The virtual port handler 42 outputs the received packet delivered from the relay unit 45 to the VM virtual port 21 and passes the transmission packet input from the VM virtual port 21 to the relay unit 45.

The inter-thread communication port 43 is a port used for communication with another thread 25. The thread 25 transmits, for example, a packet and a notification from the inter-thread communication port 43 to another thread 25 and receives, for example, a packet and a notification sent from another thread 25 at the inter-thread communication port 43.

Based on an instruction from the relay unit 45, the search unit 44 specifies an action for the received packet using the flow table group 22 and the flow cache 23 and notifies the relay unit 45 of the specified action. When there is an entry matching the flow information of the received packet in the flow cache 23, the search unit 44 notifies the relay unit 45 of the action of the entry. Meanwhile, when there is no entry matching the flow information of the received packet in the flow cache 23, the search unit 44 specifies an action corresponding to the flow information using the flow table group 22 and registers the specified action, together with the flow information, in the flow cache 23.

The search unit 44 includes a registration unit 44a and a determination unit 44b. The registration unit 44a registers a new entry in the flow cache 23. When the registration unit 44a registers a new entry in the flow cache 23, the determination unit 44b determines whether or not the output destination designated by the action of the entry is a VM virtual port 21 of another NUMA node 1, and notifies the determination result to the registration unit 44a and the relay unit 45. When the output destination is the VM virtual port 21 of another NUMA node 1, the registration unit 44a changes the output destination to the thread 25 corresponding to another NUMA node 1 and registers changed output destination in the flow cache 23.

Figure 5:
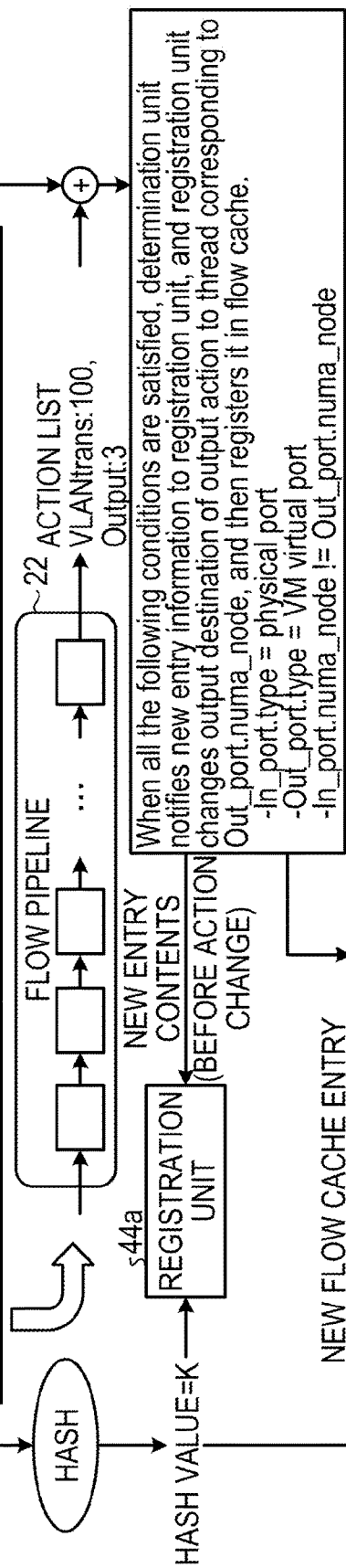
FIG. 5 is a view illustrating an example of flow cache registration.

FIG. 5 is a view illustrating an example of flow cache registration. As illustrated in FIG. 5, when a new entry is registered in the flow cache 23 from the flow information of the received packet and the action list specified from the flow table group 22, the determination unit 44b determines whether or not the entry satisfies a predetermined condition.

Here, the predetermined condition is "In_port.type=physical port, Out_port.type=VM virtual port, and In_port.numa_node !=Out_port.numa_node."

"In_port" is a reception port, and "Out_port" is an output destination port. The type is a port type, and "numa_node" is the number of NUMA node 1. That is, the determination unit 44b determines whether or not the reception port type is "physical port," the output destination port type is "VM virtual port," and the number of the NUMA node 1 of the output destination port is different from the number of the NUMA node 1 of the reception port. Then, when the predetermined condition is satisfied, the registration unit 44a changes the output destination of the action to the thread 25 corresponding to "Out_port.numa_node" and registers the changed output destination in the flow cache 23.

In FIG. 5, when the predetermined condition is satisfied, the VM virtual port #2 (Output: 2) specified as the output destination from the flow table group 22 is changed to the thread #2 (Output: Thread2) and registered in an address K of the flow cache 23. Here, K is a hash value calculated from the flow information of the received packet.

Referring back to FIG. 3, the relay unit 45 processes the received packet based on the action notified from the search unit 44. The relay unit 45 passes the packet whose action output destination is the VM virtual port #1, to the virtual port handler 42. Upon receiving the determination result that the received packet satisfies the predetermined condition from the determination unit 44b, the relay unit 45 instructs the thread controller 46 to execute the queue switching procedure.

The thread controller 46 executes the queue switching procedure using the inter-thread communication port 43. Specifically, the thread controller 46 performs a queue switching notification to the switching destination thread 25 and registers the hardware reception queue 31a corresponding to the switching destination thread 25 as the destination of the queue switching target flow in the filter 31b of the NIC 3. Then, the thread controller 46 reads the packet of the queue switching target flow from the reception queue 24a and the hardware reception queue 31a, and transfers the packet to the switching destination thread 25. Then, when the switching is completed, the thread controller 46 performs a queue switching completion notification to the switching destination thread 25.

After setting the filter 31b of the NIC 3, the thread controller 46 determines that the switching is completed when one of the following two conditions is satisfied in the process of the queue switching target flow.
(1) When there is no read data (there is no received packet) at the time of performing the reading from the receive queue 24a.
(2) When the processing of packets equivalent to the total number of queue lengths of the reception queue 24a and the corresponding hardware reception queue 31a is executed.

For the above condition (1), when there is no received packet at the time of performing the reading from the reception queue 24a, this indicates that there is no new arrival packet and all the received packets at the time of setting the filter 31b of the NIC 3 have been processed. Therefore, it may be determined that the flow process in the hardware reception queue 31a/the reception queue 24a has been completed.

For the above condition (2), after switching setting of the reception of a certain flow from the hardware reception queue #1 to the hardware reception queue #2 (setting of the filter 31b), the packet of the corresponding flow is not newly stored in the hardware reception queue #1 and the corresponding reception queue #1. Therefore, at the time of setting of the filter 31b, the number of packets already received in the hardware reception queue #1 and the corresponding reception queue #1 is at most Size (hardware reception queue #1)+Size (reception queue #1). Here, Size (Q) is the maximum length of a queue Q. Therefore, it may be determined that the packet of the queue switching target flow is not stored in the hardware reception queue 31a/the reception queue 24a after processing the packets of Size (hardware reception queue #1)+Size (reception queue #1).

Upon receiving the queue switching notification from another thread 25, the thread controller 46 suspends the reception process of the reception port of the queue switching target flow and registers a flow and an action included in the queue switching notification in the flow cache 23. Further, upon receiving a packet from another thread 25, the thread controller 46 processes the packet based on the flow cache 23. Further, upon receiving the queue switching completion notification from another thread 25, the thread controller 46 resumes the reception process of the reception port of the queue switching target flow.

Although two threads 25 are illustrated in FIG. 3, three or more threads 25 may be provided. Although one NIC 3 is illustrated in FIG. 3, a plurality of NICs 3, physical ports 31, and virtual switch ports 24 corresponding to the physical ports 31 may be provided. Although one VM virtual port 21 for each NUMA node 1 is illustrated in FIG. 3, a plurality of VM virtual ports 21 for each NUMA node 1 may be provided.

FIGS. 6A and 6B are views illustrating an example of a thread control packet. Here, the thread control packet refers to a packet transmitted and received using the inter-thread communication port 43. FIG. 6A(a) illustrates the basic format, FIG. 6A(b) illustrates an example of a queue switching notification, FIG. 6B(c) illustrates an example of a queue switching completion notification, and FIG. 6B(d) illustrates an example of a data transfer packet.

As illustrated in FIG. 6A(a), the thread control packet includes TYPE of 2B (byte), Length of 2B, Hash Value of 4B, and Payload of Length byte.

TYPE indicates a type of the thread control packet, which is 'start' in the case of queue switching notification, 'comp' in the case of queue switching completion notification, and 'data' in the case of data transfer. Length is a size (number of bytes) of a Payload part of the thread control packet. Hash Value is a hash value of the flow information of the notification flow. Payload is notification data and contains contents different for each TYPE.

As illustrated in FIG. 6A(b), in the case of queue switching notification, Payload includes flow cache entry information (before action rewrite) of the queue switching target flow. In addition, as illustrated in FIG. 6B(c), in the case of queue switching completion notification, Payload includes flow information of the queue switching target flow. In addition, as illustrated in FIG. 6B(d), in the case of a data transfer packet between threads 25, Payload includes flow information of the queue switching target flow and a transfer packet.

Next, the procedure of process by the thread 25 will be described. In the procedure of process by the thread 25, the information of a flow to be transitioned by the queue switching procedure is managed using two transition management tables. FIG. 7 is a view illustrating an example of transition management tables. In FIG. 7, two transition management tables are represented as a transition management table A and a transition management table B.

The transition management table A is used by a transition source thread 25 to hold information on a flow under transition. Specifically, a destination thread 25 corresponding to the flow under transition and a count value used for completion determination are held in the transition management table A. The initial value of the count value is Size (hardware reception queue 31a)+Size (reception queue 24a) of the transition source, and the count value is decremented by 1 each time a packet of the reception queue 24a is processed. For example, for Flow_A, the number of the destination thread 25 is 2 and the count value is 512.

The transition management table B is used by a transition destination thread 25 to hold the information of a reception port corresponding to the flow under transition. Specifically, a suspend port number and the number of flows under transition are held in the transition management table B. The suspend port number is a number of a port on which the reception process is being stopped due to the existence of a flow under transition. The number of flows under transition is the number of flows to which a port being stopped is related. When the number of flows under transition does not become 0, the reception process of the corresponding port is not resumed.

Figure 8A:
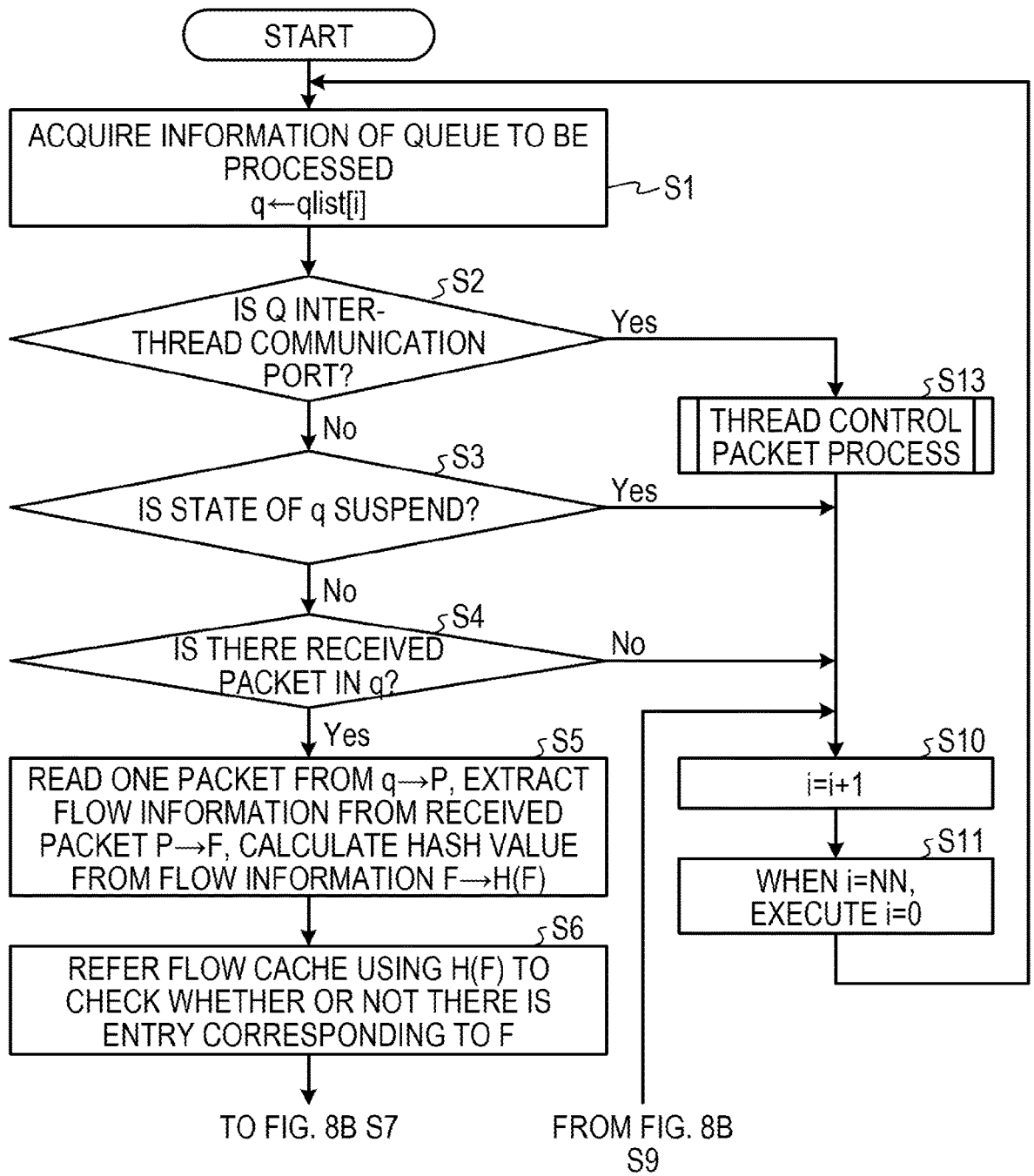
FIGS. 8A-B are flowcharts illustrating a procedure of a reception process by a thread.
Figure 8B:
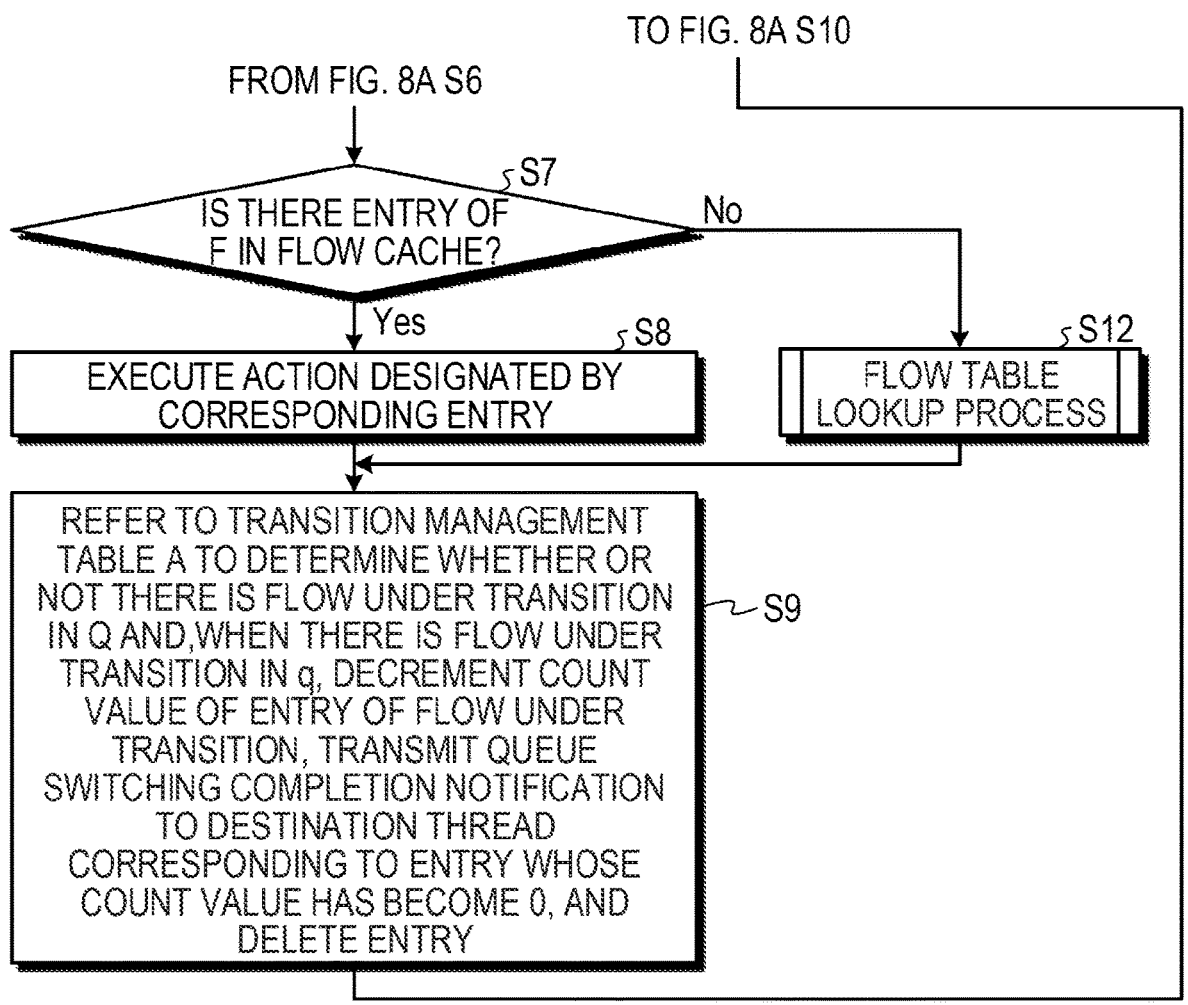

FIG. 8 is a flowchart illustrating the procedure of the reception process by the thread 25. As illustrated in FIG. 8, the thread 25 acquires information of a queue to be processed (operation S1). That is, it is assumed that qlist[i] be information of a queue q. Here, qlist[ ] is a list that stores queue information, the initial value of i is 0, and q information and qlist[ ] are a structure.

Then, the thread 25 determines whether or not q is an inter-thread communication port 43 (operation S2). When it is determined that q is not the inter-thread communication port 43, the thread 25 determines whether or not the state of q is suspend (operation S3). When it is determined that the state of q is not suspend, the thread 25 determines whether or not there is a received packet in q (operation S4).

When it is determined that there is a received packet in q, the thread 25 reads one packet from q, sets the packet as P, extracts flow information from the received packet P, sets the flow information as F, calculates a hash value from the flow information F, and set the hash value as H(F) (operation S5). Then, the thread 25 refers to the flow cache 23 using H(F) to check whether or not there is an entry corresponding to F (operation S6).

Then, the thread 25 determines whether or not there is an entry of F in the flow cache 23 (operation S7). When it is determined that there is an entry of F in the flow cache 23, the thread 25 executes an action designated by the entry (operation S8). Then, the thread 25 refers to the transition management table A to determine whether or not there is a flow under transition in q. When it is determined that there is a flow under transition in q, the thread 25 decrements the count value of the entry of the flow under transition, transmits the queue switching completion notification to the destination thread 25 corresponding to the entry whose count value has become 0, and deletes the entry (operation S9).

Then, the thread 25 adds 1 to i (operation S10), and sets i to 0 when i is equal to NN (operation S11). Here, NN is the number of ports including the inter-thread communication port 43. Then, the thread 25 returns to operation S1.

When it is determined in the operation S7 that there is no entry of F in the flow cache 23, the thread 25 refers to the flow table group 22 to execute a flow table lookup process of registering the entry of F in the flow cache 23 (operation S12). Then, the thread 25 proceeds to operation S9.

In addition, when it is determined in the operation S4 that there is no received packet in q, and when it is determined in the operation S3 that the state of q is suspend, the thread 25 proceeds to operation S10. When it is determined in the operation S2 that q is an inter-thread communication port 43, the thread 25 executes a thread control packet process for processing a thread control packet (operation S13) and then proceeds to operation S10.

In this manner, the thread 25 may process the received packet by repeatedly processing the reception ports in order.

Figure 9:
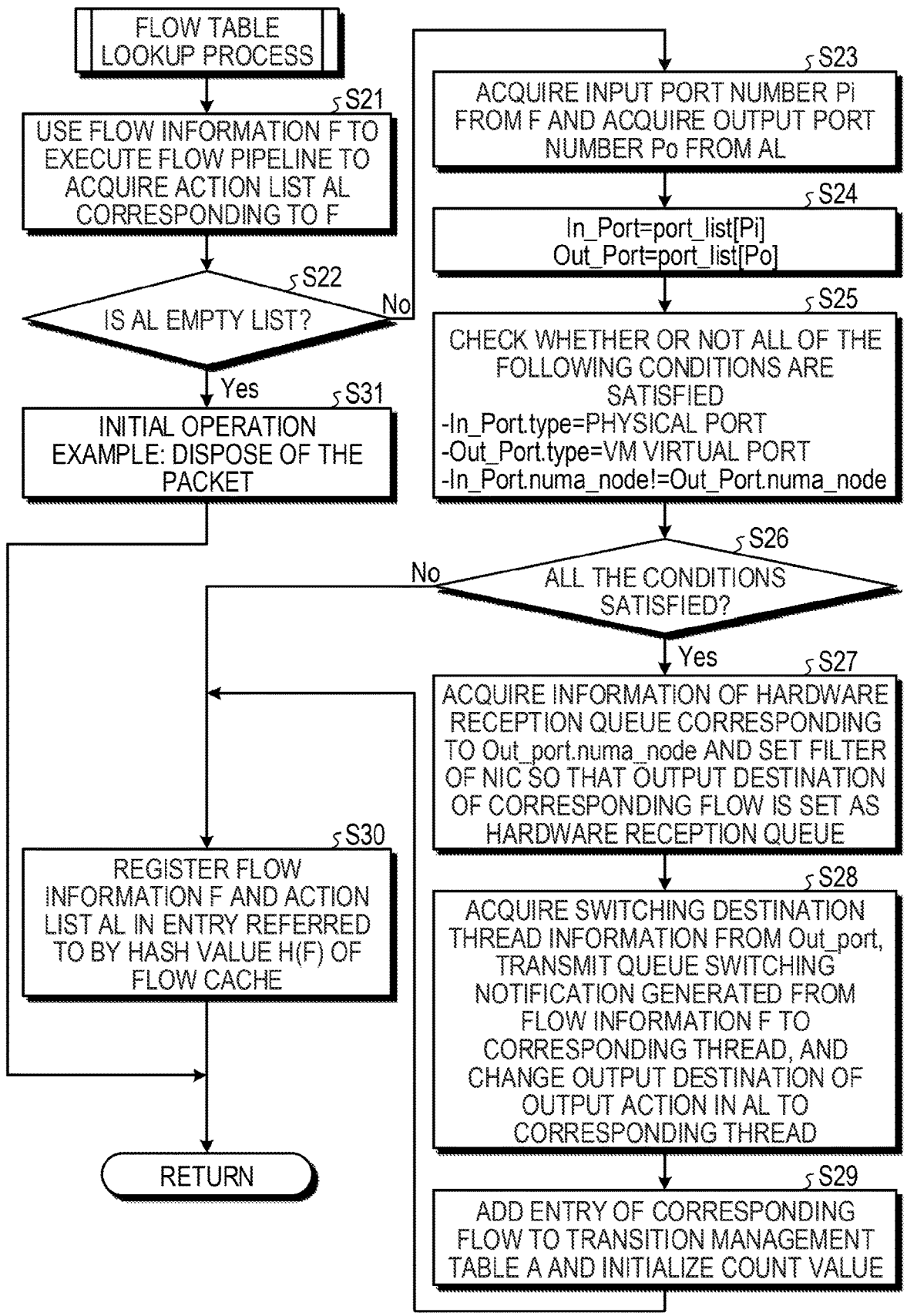
FIG. 9 is a flowchart illustrating a procedure of a flow table lookup process.

FIG. 9 is a flowchart illustrating the procedure of the flow table lookup process. As illustrated in FIG. 9, the thread 25 uses the flow information F to execute a flow pipeline to acquire an action list AL corresponding to F (operation S21). Then, the thread 25 determines whether or not AL is an empty list (operation S22). When it is determined that AL is not the empty list, the thread 25 acquires an input port number Pi from F and acquires an output port number Po from AL (operation S23).

Then, the thread 25 sets "port_list[Pi]" as "In_Port" and sets "port_list[Po]" as "Out_Port" (operation S24). Here, "port_list[ ]" is a list that stores port information and the port information is a structure. Then, the thread 25 checks whether or not all of the following conditions are satisfied (operation S25). The following conditions are: "In_port.type=physical port, Out_port.type=virtual port for VM, and In_port.numa_node !=Out_port.numa_node."

Then, the thread 25 determines whether or not all the conditions are satisfied (operation S26). When it is determined that all the conditions are satisfied, the thread 25 acquires information of the hardware reception queue 31a corresponding to "Out_port.numa_node" and sets the filter 31b of the NIC 3 such that the output destination of the flow is set as the hardware reception queue 31a (operation S27).

Then, the thread 25 acquires the switching destination thread information from the "Out_port," transmits the queue switching notification generated from the flow information F to the thread 25, and changes the output destination of an output action in AL to the corresponding thread (operation S28). Here, the output action is an action of outputting a received packet among actions.

Then, the thread 25 adds an entry of the flow to the transition management table A and initializes the count value (operation S29). Then, the thread 25 registers the flow information F and the action list AL in an entry referred to by the hash value H(F) of the flow cache 23 (operation S30).

When it is determined in the operation S26 that any of the conditions is not satisfied, the thread 25 proceeds to the operation S30. When it is determined in the operation S22 that AL is an empty list, the thread 25 executes a prescribed initial operation (operation S31). Here, the prescribed initial operation means, for example, discarding the corresponding packet.

In this way, when all the conditions are satisfied, the thread 25 may switch the reception queue 24a by setting the filter 31b, transmitting the queue switching notification, and changing the output destination of the output action based on Out_Port.

Figure 10:
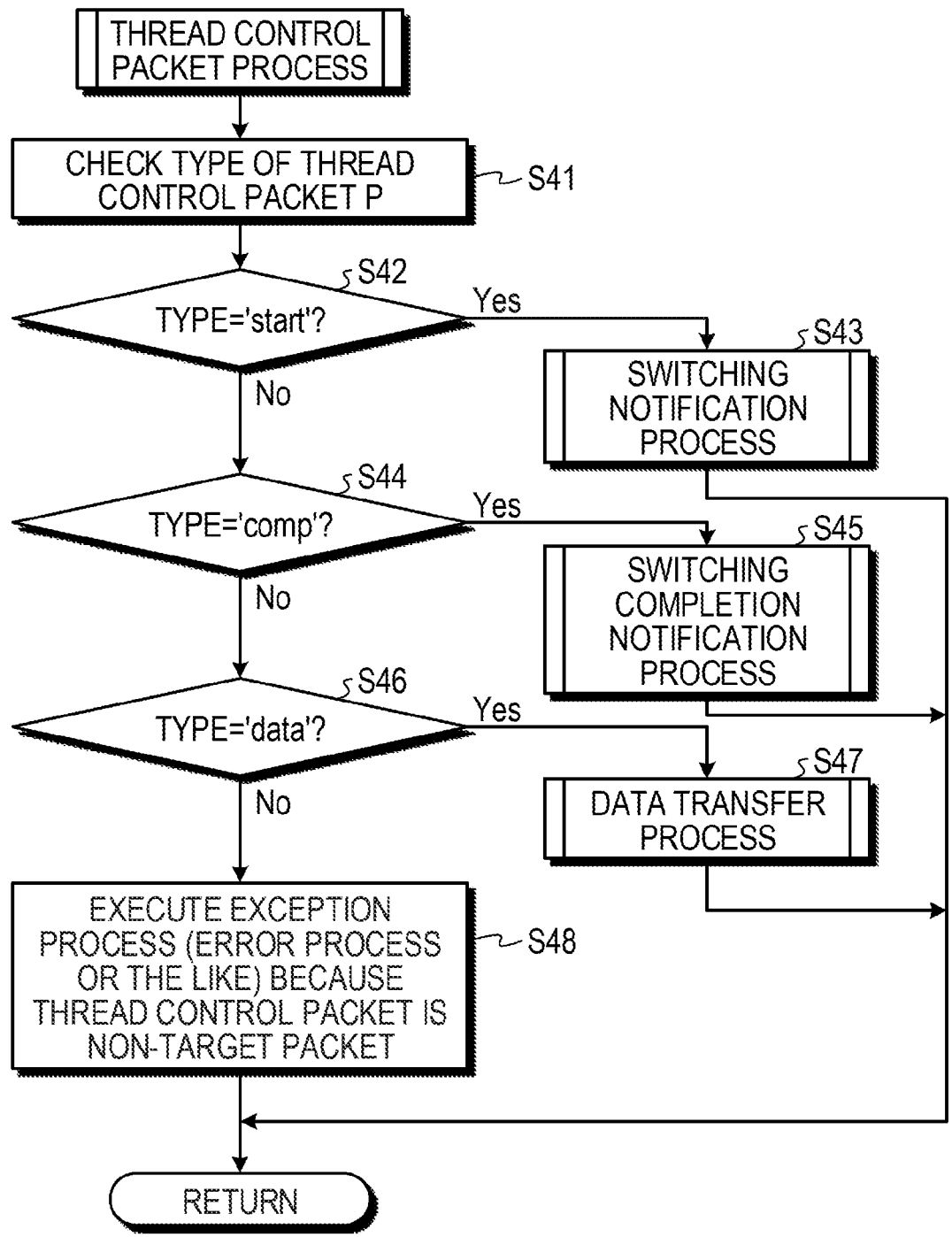
FIG. 10 is a flowchart illustrating a procedure of a thread control packet process.

FIG. 10 is a flowchart illustrating the procedure of the thread control packet process. As illustrated in FIG. 10, the thread 25 checks TYPE of a thread control packet P (operation S41). Then, the thread 25 determines whether or not TYPE is 'start' (operation S42). When it is determined that TYPE is 'start,' the thread 25 performs a switching notification process as a process in a case where a queue switching notification is received (operation S43).

Meanwhile, when it is determined that TYPE is not 'start,' the thread 25 determines whether or not TYPE is 'comp' (operation S44). When it is determined that TYPE is 'comp,' the thread 25 executes a switching completion notification process as a process in a case where a queue switching completion notification is received (operation S45).

Meanwhile, when it is determined that TYPE is not 'comp,' the thread 25 determines whether or not TYPE is 'data' (operation S46). When it is determined that TYPE is 'data,' the thread 25 executes a data transfer process as a process in a case where a data transfer packet between threads 25 is received (operation S47).

Meanwhile, when it is determined that TYPE is not 'data,' the thread 25 executes an exception process because the thread control packet is a non-target packet (operation S48). An example of the exception process may include error processing.

Figure 11:
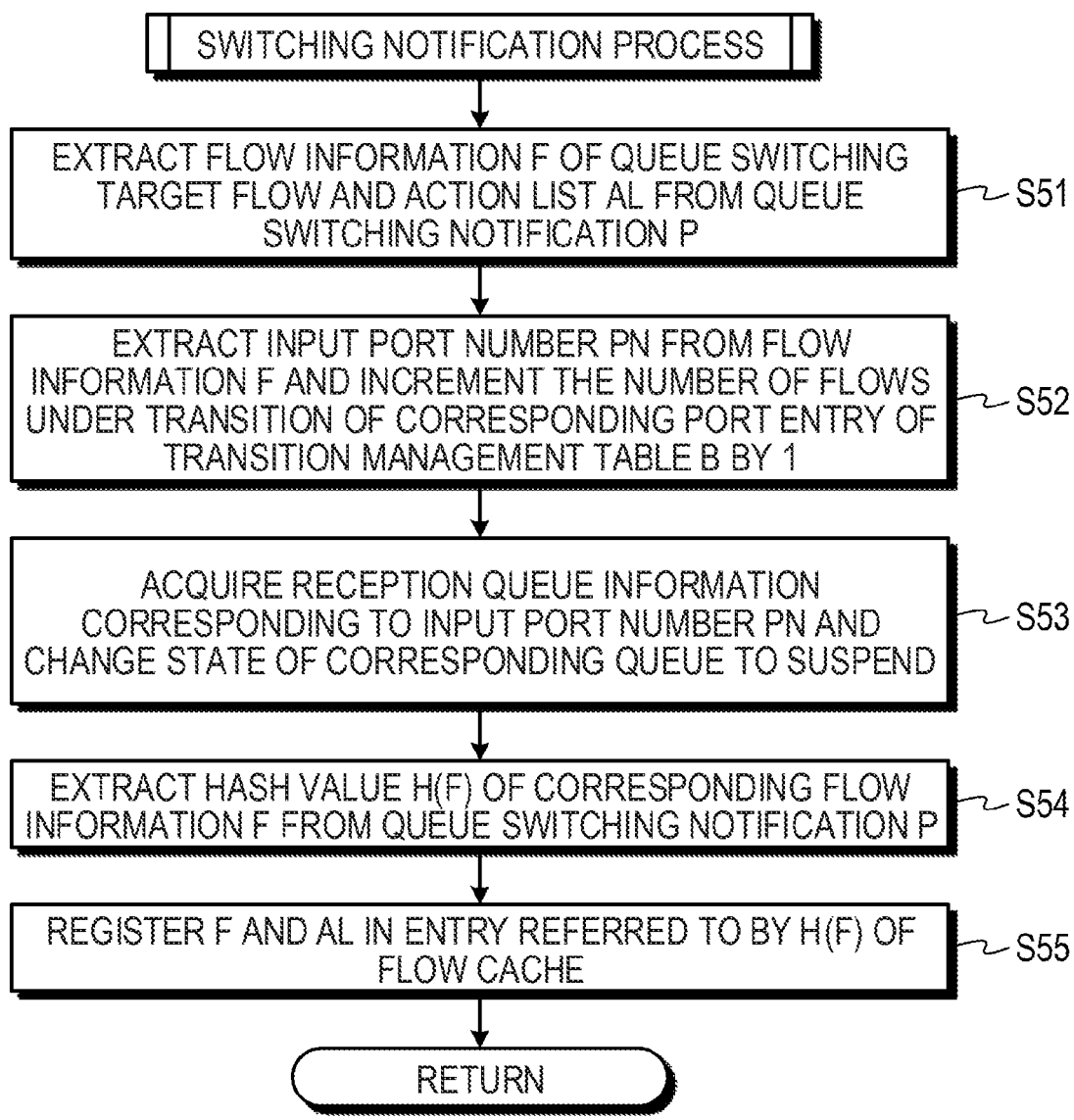
FIG. 11 is a flowchart illustrating a procedure of a switching notification process.

FIG. 11 is a flowchart illustrating the procedure of the switching notification process. As illustrated in FIG. 11, the thread 25 extracts the flow information F of the queue switching target flow and the action list AL from the queue switching notification P (operation S51). Then, the thread 25 extracts the input port number PN from the flow information F and increments the number of flows under transition of the corresponding port entry of the transition management table B by 1 (operation S52).

Then, the thread 25 acquires the reception queue information corresponding to the input port number PN and changes the state of the queue to suspend (operation S53). Then, the thread 25 extracts the hash value H(F) of the flow information F from the queue switching notification P (operation S54) and registers F and AL in the entry referred to by H(F) of the flow cache 23 (operation S55).

In this manner, by registering F and AL in the entry referred to by H(F) of the flow cache 23, the transition destination thread 25 may transmit a packet in which the reception queue 24a has been switched to the destination VM.

Figure 12:
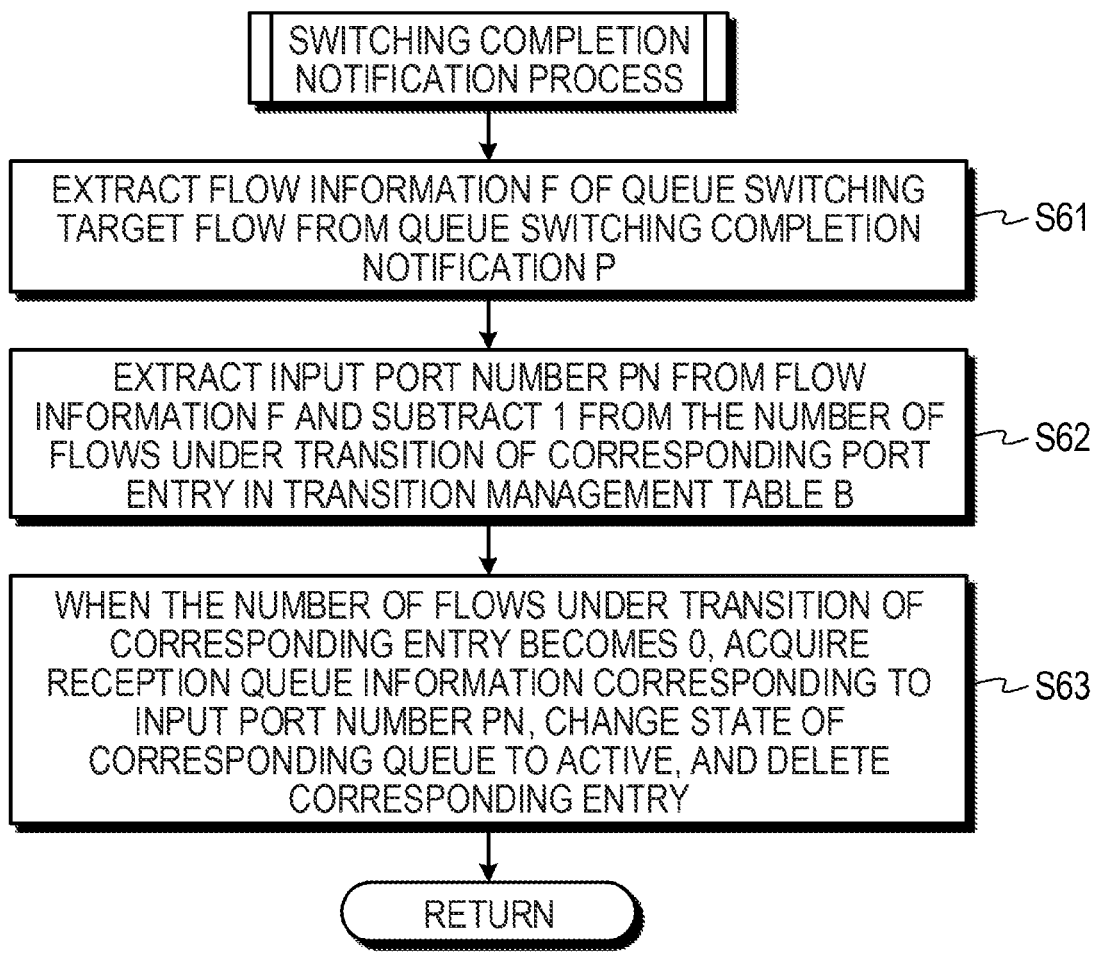
FIG. 12 is a flowchart illustrating a procedure of a switching completion notification process.

FIG. 12 is a flowchart illustrating the procedure of the switching completion notification process. As illustrated in FIG. 12, the thread 25 extracts the flow information F of the queue switching target flow from the queue switching completion notification P (operation S 61). Then, the thread 25 extracts the input port number PN from the flow information F and subtracts 1 from the number of flows under transition of the corresponding port entry in the transition management table B (operation S62).

Then, when the number of flows under transition of the corresponding entry becomes 0, the thread 25 acquires the reception queue information corresponding to the input port number PN, changes the state of the corresponding queue to active, and deletes the corresponding entry (operation S63).

In this manner, when the number of flows under transition of the corresponding entry becomes 0, the transition destination thread 25 resumes the packet reception from the NIC3 by changing the state of the queue corresponding to the input port number PN to active.

Figure 13:
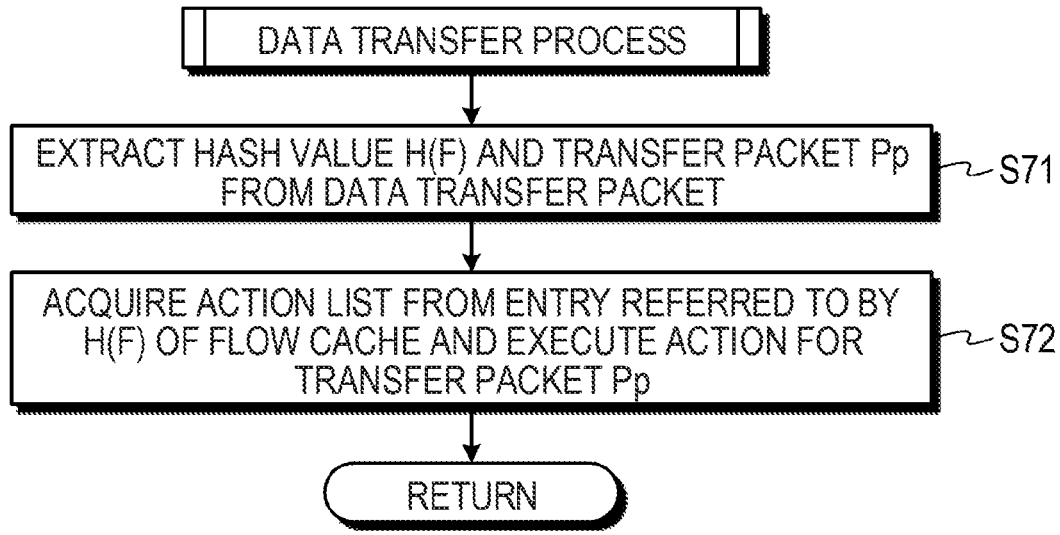
FIG. 13 is a flowchart illustrating a procedure of a data transfer process.
Figure 14:
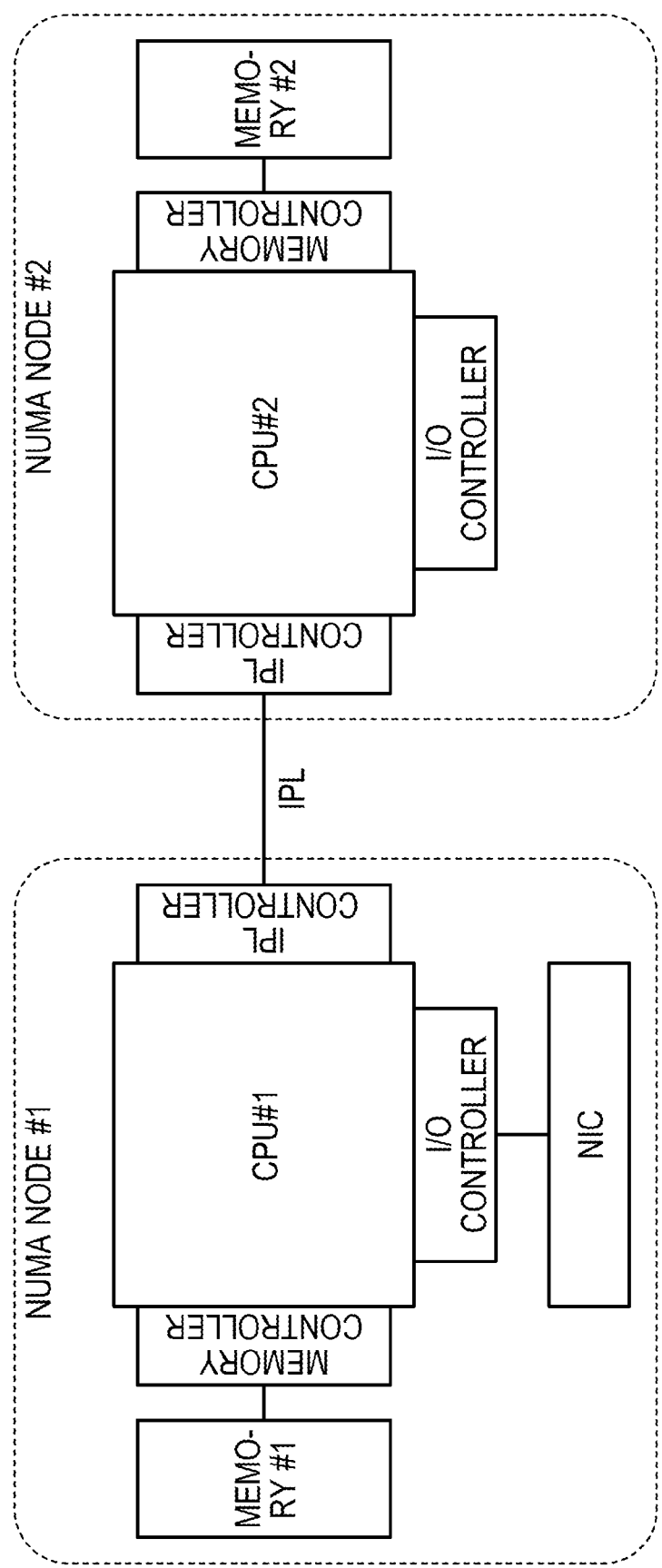
FIG. 14 is a view illustrating a server of a NUMA architecture.
Figure 15:
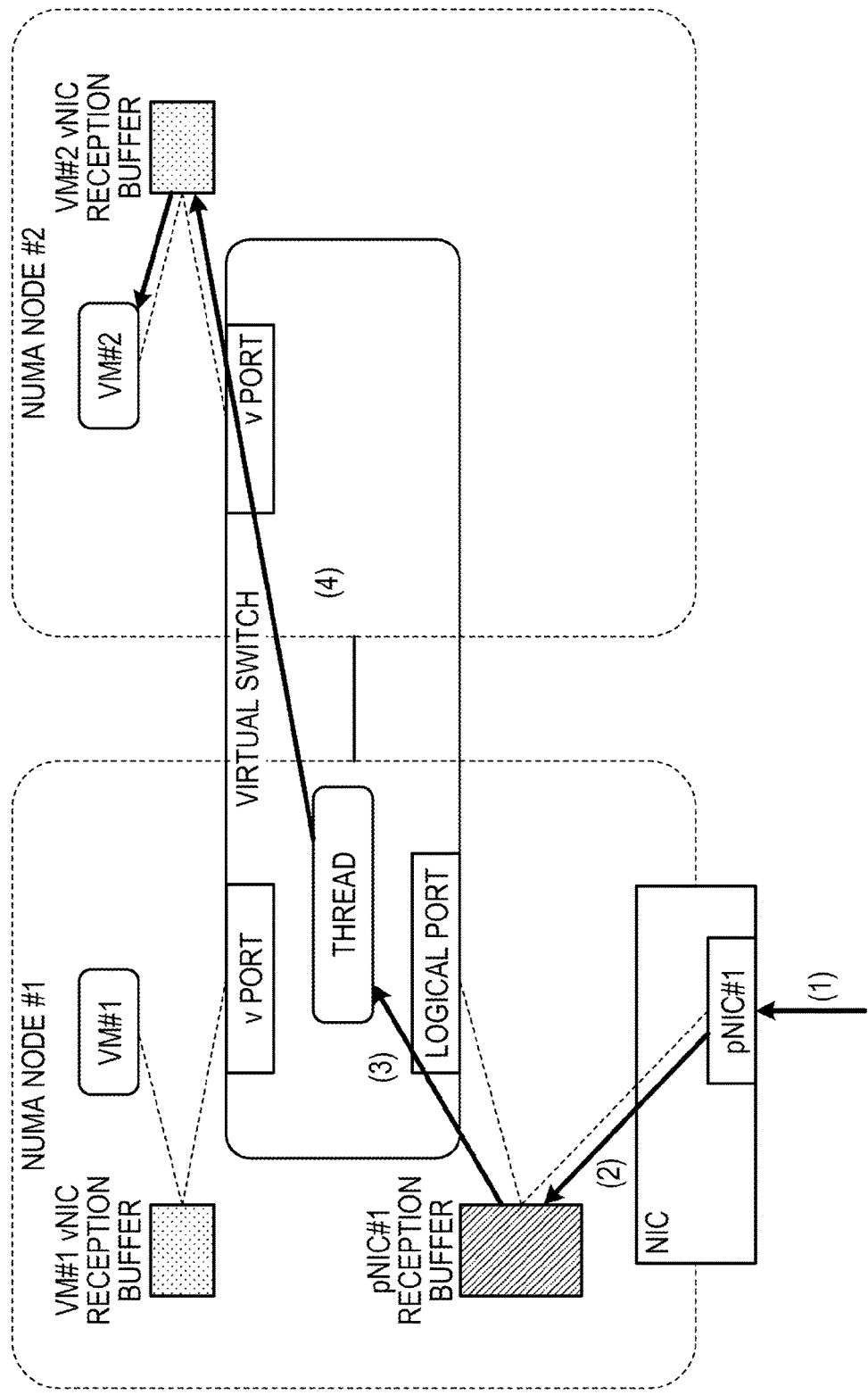
FIG. 15 is a view for explaining performance degradation in a virtual environment using a virtual switch.

FIG. 13 is a flowchart illustrating the procedure of the data transfer process. As illustrated in FIG. 13, the thread 25 extracts a hash value H(F) and a transfer packet Pp from a data transfer packet (operation S71). Then, the thread 25 acquires an action list from an entry referred to by H(F) of the flow cache 23 and executes an action for the transfer packet Pp (operation S72).

In this manner, the transition destination thread 25 may appropriately process a packet received at the transition source before queue switching by executing an action registered in the flow cache 23 for the transfer packet Pp.

As described above, in the embodiment, the thread #1 sets the filter 31b of the NIC 3 to the hardware reception queue #2 for the flow addressed to the VM virtual port #2 and notifies the thread #2 of the queue switching. Then, the thread #1 transmits the packets in the hardware reception queue #1 and the reception queue #1 to the thread #2 for the corresponding flow. Then, upon receiving the notification of the queue switching for the corresponding flow, the thread #2 temporarily suspends the reception process of the virtual switch port #1, processes the packets transmitted from the thread #1, and then, resumes the reception process of the virtual switch port #1. Therefore, the information processing apparatus 10 may dynamically switch the setting of the filter 31b so that the packets received by the NIC 3 are DMA-transferred to the NUMA node #2 operated by the destination VM, and may transmit the packets to the destination VM in the order of packet reception.

In addition, in the embodiment, when registering an entry in the flow cache #1 for the corresponding flow, the thread #1 determines whether or not it is necessary to set the filter 31b of the NIC 3 in the hardware reception queue #2. Then, when it is determined that the setting is necessary, the thread #1 changes the output destination of the corresponding entry to the thread #2 for the corresponding flow, sets the filter 31b of the NIC 3 to the hardware reception queue #2, and notifies the queue switching to the thread #2. Then, the thread #1 transmits the packets in the hardware reception queue #1 and the reception queue #1 to the thread #2 for the corresponding flow. Therefore, the information processing apparatus 10 may execute the queue switching procedure when receiving the first packet of the corresponding flow.

Further, in the embodiment, when there is no packet in the hardware reception queue #1 and the reception queue #1 for the corresponding flow, the thread #1 notifies the thread #2 of the queue switching completion. Alternatively, when transmitting the packets of the number of Size (hardware reception queue #1)+Size (reception queue #1) to the thread #2, the thread #1 notifies the thread #2 of the queue switching completion. Then, upon receiving the queue switching completion for the corresponding flow, the thread #2 resumes the reception process of the virtual switch port #1. Therefore, the information processing apparatus 10 may continue the reception process of the corresponding flow even after the queue switching.

Furthermore, in the embodiment, when "In_port.type=physical port, Out_port.type=VM virtual port, and In_port.numa_node!=Out_port.numa_node," it is determined that it is necessary to execute the queue switching procedure. Therefore, the information processing apparatus 10 may accurately determine the necessity of the queue switching.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium storing a program that causes a computer including a first processor in which a first thread is executed at a first node having a first reception buffer and a communication device and a second processor in which a second thread is executed at a second node having a second reception buffer, the first thread comprising:
setting an output destination of the communication device to the second reception buffer with respect to a flow addressed to a virtual port of a virtual machine executed in the second processor;
notifying the second processor of a switch notification information of the setting the output destination of the communication device to the second reception buffer; and
transferring a packet stored in the first reception buffer to the second processor, and the second thread comprising:
receiving the switching notification;
suspending temporarily a reception process of the second reception buffer for the flow;
transferring the packet transferred by the first processor to the virtual port; and
resuming the reception process of the second reception buffer after the packet is transferred to the virtual port.

2. The non-transitory computer-readable recording medium according to claim 1,
wherein the first thread further comprising:
determining whether the first reception buffer is to be shifted to the second reception buffer for storing packets of a flow, when an entry of the flow is registered in a flow-cache of the first processor;
when the first reception buffer is to be shifted to the second reception buffer for storing packets of the flow, shifting the output destination for an action of the entry of the flow to the second processor;
setting the output destination of the communication device to the second reception buffer;
notifying the second processor of a switch notification information of the setting the output destination of the communication device to the second reception buffer; and
transferring the packet stored in the first reception buffer to the second processor.

3. The non-transitory computer-readable recording medium according to claim 1,
wherein the first thread is further comprising:
notifying the second processor of a completion notification information of completing the setting the output destination of the communication device to the second reception buffer, when one of a case where there is no packet stored in the first reception buffer and a case where predetermined number of packets stored in the first reception buffer are transferred to the second processor, and
wherein the second thread is further comprising:
resuming the reception process of the second reception buffer, when the completion notification information is received.

4. The non-transitory computer-readable recording medium according to claim 2,
wherein the first thread is further comprising:
shifting the first reception buffer to the second reception buffer when reception ports of the first reception buffer and the second reception buffer are physical ports output destination ports of the first reception buffer and the second reception buffer are virtual ports of the virtual machine, and a node including the reception port is different from a node including the virtual machine.

5. A method for shifting a first reception buffer included in a first node to a second reception buffer included in a second node, the first node including a first processor and a communication device and the second node including a second processor, the method comprising:
setting an output destination of the communication device to the second reception buffer with respect to a flow addressed to a virtual port of a virtual machine executed in the second processor, by the first processor;
notifying the second processor of a switch notification information of the setting the output destination of the communication device to the second reception buffer, by the first processor;
transferring a packet stored in the first reception buffer to the second processor, by the first processor;
receiving the switching notification, by the second processor;
suspending temporarily a reception process of the second reception buffer for the flow, by the second processor;
transferring the packet transferred by the first processor to the virtual port, by the second processor; and
resuming the reception process of the second reception buffer after the packet is transferred to the virtual port, by the second processor.

6. An information processing apparatus comprising:
a communication device configured to include at least two queues and receive a flow addressed to a virtual port of a virtual machine, data output from a first queue of the at least two queues accessing to a first reception buffer and data output from a second queue of the at least two queues accessing to a second reception buffer;
a first memory configured to include the first reception buffer;
a second memory configured to include second reception buffer;
a first processor coupled to the first memory; and
a second processor coupled to the second memory,
wherein the first processor is configured to:
set an output destination of the communication device to the second reception buffer with respect to the flow addressed to the virtual port of the virtual machine executed in the second processor,
notify the second processor of a switch notification information of the setting the output destination of the communication device to the second reception buffer, and
transfer a packet stored in the first reception buffer to the second processor, and
wherein the second processor is configured to:
receive the switching notification,
suspend temporarily a reception process of the second reception buffer for the flow,
transfer the packet transferred by the first processor to the virtual port, and
resume the reception process of the second reception buffer after the packet is transferred to the virtual port.

7. The information processing apparatus according to claim 6,
wherein the first processor is further configured to:
determine whether the first reception buffer is to be shifted to the second reception buffer for storing the packet, when an entry of the flow is registered in a flow-cache of the first processor, when the first reception is to be shifted to the second reception buffer for storing the packet, shift the output destination for an action of the entry of the flow to the second processor, set the output destination of the communication device to the second reception buffer, notify the second processor of a switch notification information of the setting the output destination of the communication device to the second reception buffer, and transfer the packet stored in the first reception buffer to the second processor.

8. The information processing apparatus according to claim 6, wherein the first processor is further configured to:

notify the second processor of a completion notification information of completing the setting the output destination of the communication device to the second reception buffer, when one of a case where there is no packet stored in the first reception buffer and a case where predetermined number of packets stored in the first reception buffer are transferred to the second processor, and wherein the second processor is further configured to:

resume the reception process of the second reception buffer, when the completion notification information is received.

9. The information processing apparatus according to claim 7, wherein the first processor is further configured to:

shift the first reception buffer to the second reception buffer when reception ports of the first reception buffer and the second reception buffer are physical ports output destination ports of the first reception buffer and the second reception buffer are virtual ports of the virtual machine, and a node including the reception port is different from a node including the virtual machine.

* * * * *